United States Patent
Ball et al.

(10) Patent No.: US 9,890,867 B2
(45) Date of Patent: Feb. 13, 2018

(54) SANITARY HYDRANT

(71) Applicant: WCM Industries, Inc., Colorado Springs, CO (US)

(72) Inventors: William T. Ball, Colorado Springs, CO (US); Eric Pilarczyk, Colorado Springs, CO (US); Cody Jackson, Colorado Springs, CO (US)

(73) Assignee: WCM INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 15/238,914

(22) Filed: Aug. 17, 2016

(65) Prior Publication Data

US 2017/0248244 A1 Aug. 31, 2017

Related U.S. Application Data

(60) Provisional application No. 62/301,612, filed on Feb. 29, 2016.

(51) Int. Cl.
| | |
|---|---|
| *E03B 9/06* | (2006.01) |
| *E03B 9/14* | (2006.01) |
| *E03B 9/02* | (2006.01) |
| *F16K 27/00* | (2006.01) |

(52) U.S. Cl.
CPC .......... *F16K 27/006* (2013.01); *E03B 9/027* (2013.01); *E03B 9/06* (2013.01); *E03B 9/14* (2013.01); *Y10T 137/5415* (2015.04)

(58) Field of Classification Search
CPC . Y10T 137/5415; F16K 27/006; E03B 9/027; E03B 9/06; E03B 9/14
See application file for complete search history.

(56) References Cited

U.S. PATENT DOCUMENTS

| | | | |
|---|---|---|---|
| 21,858 | A | 10/1858 | Swan |
| 53,944 | A | 4/1866 | Biggs et al. |
| 244,804 | A | 7/1881 | Gillespie |
| 556,500 | A | 3/1896 | Fox |
| 609,805 | A | 8/1898 | Hardy |
| 610,470 | A | 9/1898 | Buehler |
| 616,542 | A | 12/1898 | Koehne |
| 695,147 | A | 3/1902 | Denney |
| 695,311 | A | 3/1902 | Hickey |
| 926,185 | A | 6/1909 | Hayes |
| 934,188 | A | 9/1909 | Kirby |
| 962,294 | A | 6/1910 | Armington |
| 1,021,537 | A | 3/1912 | Lawnin |
| 1,069,003 | A | 7/1913 | Haennig |
| 1,310,521 | A | 7/1919 | Crall |

(Continued)

OTHER PUBLICATIONS

MPH-24 Pedestal Hydrant, MAPA Products, May 2002, 2 pages.

(Continued)

*Primary Examiner* — Craig Schneider
*Assistant Examiner* — Kevin Barss
(74) *Attorney, Agent, or Firm* — Merchant & Gould P.C.

(57) ABSTRACT

A sanitary hydrant comprises an isolated reservoir that can be positioned below a freeze level at the location of installation. A piston within the isolated reservoir is operable to expel, during a downward stroke, stored fluid from the reservoir before actuating a valve that allows fluid to flow from a fluid supply source through the hydrant. On an upward stroke, the piston releases the valve and generates a negative pressure within the reservoir that draws fluid from within the hydrant into the reservoir.

20 Claims, 11 Drawing Sheets

(56) References Cited

U.S. PATENT DOCUMENTS

| | | |
|---|---|---|
| 1,426,407 A | 8/1922 | Pennington |
| 1,433,110 A | 10/1922 | Buckler |
| 1,556,241 A | 10/1925 | Mueller |
| 1,570,180 A | 1/1926 | Pulliam |
| 1,621,905 A | 3/1927 | Russell |
| 1,774,307 A | 8/1930 | Willig |
| 1,828,763 A | 10/1931 | Carnes |
| 1,936,669 A | 11/1933 | Heeter |
| 1,937,667 A | 12/1933 | Parsley et al. |
| 2,025,067 A | 12/1935 | Miller |
| 2,072,427 A | 3/1937 | O'Brien |
| 2,077,021 A | 4/1937 | Sites |
| 2,097,733 A | 11/1937 | Miller |
| 2,140,829 A | 12/1938 | Child |
| 2,306,012 A | 12/1942 | Campbell |
| 2,329,960 A | 9/1943 | Verheul |
| 2,429,940 A | 10/1947 | McDaniel |
| 2,484,063 A | 10/1949 | Ackley |
| 2,498,395 A | 2/1950 | Coss |
| 2,574,625 A | 11/1951 | Coss |
| 2,580,199 A | 12/1951 | Schmid |
| 2,583,956 A | 1/1952 | Lindsay et al. |
| 2,598,488 A | 5/1952 | Bart |
| 2,599,325 A | 6/1952 | Fritzberg |
| 2,605,781 A | 8/1952 | Schmid et al. |
| 2,629,402 A | 2/1953 | Cook |
| 2,652,224 A | 9/1953 | Noland |
| 2,664,096 A | 12/1953 | Murdock et al. |
| 2,675,825 A | 4/1954 | Hobbs et al. |
| 2,688,976 A | 9/1954 | Baker |
| 2,708,449 A | 5/1955 | Keithley |
| 2,730,326 A | 1/1956 | Staben |
| 2,893,418 A | 7/1959 | Leventhal |
| 2,949,933 A | 8/1960 | Moen |
| 2,986,341 A | 5/1961 | Goodrie |
| 2,997,054 A | 8/1961 | Woodford |
| 3,014,667 A | 12/1961 | McLean et al. |
| 3,017,896 A | 1/1962 | Papacek |
| 3,023,767 A | 3/1962 | Woodford |
| 3,029,603 A | 4/1962 | Ackroyd |
| 3,056,418 A | 10/1962 | Adams et al. |
| 3,070,116 A | 12/1962 | Noland et al. |
| 3,146,142 A | 8/1964 | Maly |
| 3,150,383 A | 9/1964 | Reich |
| 3,162,407 A | 12/1964 | Yax |
| 3,244,192 A | 4/1966 | Noland |
| 3,283,093 A | 11/1966 | Bishop |
| 3,348,862 A | 10/1967 | Leopold, Jr. et al. |
| 3,380,464 A | 4/1968 | Arterbury |
| 3,384,113 A | 5/1968 | Pennisi |
| 3,390,898 A | 7/1968 | Sumida |
| 3,392,745 A | 7/1968 | Noland |
| 3,407,837 A | 10/1968 | Fulton et al. |
| 3,414,001 A | 12/1968 | Woodford |
| 3,416,555 A | 12/1968 | Chapou |
| 3,424,189 A | 1/1969 | Woodford |
| 3,429,596 A | 2/1969 | Marshall |
| 3,480,027 A | 11/1969 | Noland |
| 3,543,786 A | 12/1970 | Woodford |
| 3,566,905 A | 3/1971 | Noland |
| 3,612,584 A | 10/1971 | Taylor |
| 3,638,680 A | 2/1972 | Kopp |
| 3,679,241 A | 7/1972 | Hoffmann |
| D227,365 S | 6/1973 | Woodford |
| D227,366 S | 6/1973 | Woodfield |
| 3,770,003 A | 11/1973 | Uroshevich |
| 3,818,874 A | 6/1974 | Tria |
| 3,885,585 A | 5/1975 | Carpentier |
| D236,892 S | 9/1975 | Carlson |
| 3,905,382 A | 9/1975 | Waterson |
| 3,913,602 A | 10/1975 | Yoon |
| 3,926,206 A | 12/1975 | Anderson et al. |
| 3,926,207 A | 12/1975 | Anderson et al. |
| 3,952,770 A | 4/1976 | Botnick |
| 3,983,896 A | 10/1976 | Harrington |
| 4,008,732 A | 2/1977 | Fichter et al. |
| 4,013,088 A | 3/1977 | Gocke et al. |
| D244,605 S | 6/1977 | Ratnik |
| 4,034,174 A | 7/1977 | McCord |
| 4,093,280 A | 6/1978 | Yoshizawa et al. |
| 4,096,877 A | 6/1978 | Arledge, II |
| 4,103,941 A | 8/1978 | Stoll |
| 4,109,671 A | 8/1978 | Hughes et al. |
| 4,112,966 A | 9/1978 | Carlson |
| 4,117,856 A | 10/1978 | Carlson |
| 4,134,424 A | 1/1979 | Zeyra et al. |
| 4,158,366 A | 6/1979 | Van Meter |
| 4,178,956 A | 12/1979 | Fillman |
| 4,182,356 A | 1/1980 | Woodford, Sr. |
| 4,209,033 A | 6/1980 | Hirsch et al. |
| 4,212,319 A | 7/1980 | Krablin |
| 4,266,813 A | 5/1981 | Oliver |
| 4,281,857 A | 8/1981 | Randall |
| 4,282,895 A | 8/1981 | Young |
| 4,286,616 A | 9/1981 | Botnick |
| 4,300,593 A | 11/1981 | Ritter |
| 4,316,481 A | 2/1982 | Fillman |
| 4,429,422 A | 2/1984 | Wareham |
| D275,512 S | 9/1984 | Shaw |
| 4,475,570 A | 10/1984 | Pike et al. |
| 4,483,361 A | 11/1984 | Jungbert, Sr. |
| 4,503,877 A | 3/1985 | Ward et al. |
| 4,577,653 A | 3/1986 | Marty |
| D284,302 S | 6/1986 | Hammarstedt |
| 4,609,006 A | 9/1986 | Parkison et al. |
| 4,619,287 A | 10/1986 | Hama et al. |
| 4,649,959 A | 3/1987 | Wadleigh |
| 4,653,521 A | 3/1987 | Fillman |
| 4,653,522 A | 3/1987 | Fillman et al. |
| 4,655,486 A | 4/1987 | Tarnay et al. |
| 4,700,732 A | 10/1987 | Francisco |
| 4,703,956 A | 11/1987 | Keech |
| 4,712,575 A | 12/1987 | Lair |
| 4,712,812 A | 12/1987 | Weir, III |
| D297,971 S | 10/1988 | Kiyota et al. |
| 4,776,362 A | 10/1988 | Domingue et al. |
| 4,784,303 A | 11/1988 | Ahad et al. |
| 4,790,573 A | 12/1988 | Cardozo |
| 4,798,221 A | 1/1989 | Crawford et al. |
| 4,821,762 A | 4/1989 | Breneman |
| 4,821,763 A | 4/1989 | Ackroyd et al. |
| 4,854,339 A | 8/1989 | Hoeptner, III |
| 4,884,725 A | 12/1989 | Ahad et al. |
| 4,909,270 A | 3/1990 | Enterante, Sr. et al. |
| 4,937,559 A | 6/1990 | Meacham et al. |
| 4,946,434 A | 8/1990 | Plaisted et al. |
| 4,964,657 A | 10/1990 | Gonzales |
| 4,976,279 A | 12/1990 | King, Sr. et al. |
| 4,984,306 A | 1/1991 | Sumerix |
| 5,024,419 A | 6/1991 | Mulvey |
| 5,029,603 A | 7/1991 | Aackroyd |
| 5,033,500 A | 7/1991 | Hoeptner, III |
| 5,045,836 A | 9/1991 | Nobles, Jr. |
| 5,050,632 A | 9/1991 | Means, Jr. |
| 5,054,517 A | 10/1991 | Liesenhoff et al. |
| 5,058,627 A | 10/1991 | Brannen |
| 5,109,929 A | 5/1992 | Spears |
| 5,129,416 A | 7/1992 | Ackroyd |
| 5,135,028 A | 8/1992 | Rickenbach et al. |
| 5,160,179 A | 11/1992 | Takagi |
| 5,195,785 A | 3/1993 | Jellison |
| 5,205,325 A | 4/1993 | Piper |
| 5,217,040 A | 6/1993 | Hochstrasser |
| 5,226,629 A | 7/1993 | Millman et al. |
| 5,228,470 A | 7/1993 | Lair et al. |
| 5,241,981 A | 9/1993 | Ahern |
| 5,246,028 A | 9/1993 | Vandepas |
| 5,261,441 A | 11/1993 | Anderson |
| 5,284,582 A | 2/1994 | Yang |
| 5,366,257 A | 11/1994 | McPherson et al. |
| 5,392,805 A | 2/1995 | Chrysler |
| 5,394,572 A | 3/1995 | Humphreys |
| 5,399,173 A | 3/1995 | Parks et al. |
| 5,402,815 A | 4/1995 | Hoch, Jr. et al. |

(56) References Cited

U.S. PATENT DOCUMENTS

| | | |
|---|---|---|
| 5,437,481 A | 8/1995 | Spears et al. |
| 5,482,329 A | 1/1996 | McCall et al. |
| 5,496,076 A | 3/1996 | Lin |
| 5,551,473 A | 9/1996 | Lin et al. |
| 5,555,907 A | 9/1996 | Philipp |
| 5,590,679 A | 1/1997 | Almasy et al. |
| 5,603,347 A | 2/1997 | Eaton |
| 5,632,303 A | 5/1997 | Almasy et al. |
| 5,649,723 A | 7/1997 | Larsson |
| 5,653,254 A | 8/1997 | Condon et al. |
| 5,690,141 A | 11/1997 | Creaghe |
| 5,701,925 A | 12/1997 | Mulligan et al. |
| 5,740,831 A | 4/1998 | DeNardo et al. |
| 5,752,542 A | 5/1998 | Hoeptner, III |
| 5,788,443 A | 8/1998 | Cabahug |
| 5,813,428 A | 9/1998 | Almasy et al. |
| 5,890,241 A | 4/1999 | Ball |
| 5,906,341 A | 5/1999 | Brown |
| 5,911,240 A | 6/1999 | Kolar et al. |
| 5,961,095 A | 10/1999 | Schroff |
| 5,964,246 A | 10/1999 | Meeker |
| D421,092 S | 2/2000 | Martin |
| 6,041,611 A | 3/2000 | Palmer |
| 6,047,723 A | 4/2000 | Hoeptner, III |
| 6,132,138 A | 10/2000 | Haese |
| 6,135,359 A | 10/2000 | Almasy et al. |
| 6,142,172 A | 11/2000 | Schuler et al. |
| 6,178,988 B1 | 1/2001 | Royle |
| 6,186,558 B1 | 2/2001 | Komolrochanaporn |
| D439,311 S | 3/2001 | Martin |
| 6,206,039 B1 | 3/2001 | Schuler et al. |
| 6,247,491 B1 | 6/2001 | Petryna |
| 6,338,364 B1 | 1/2002 | Mendenhall |
| 6,363,960 B1 | 4/2002 | Gauss |
| 6,427,716 B1 | 8/2002 | Hoeptner, III |
| 6,431,204 B1 | 8/2002 | Ball |
| 6,447,017 B1 | 9/2002 | Gilbreath et al. |
| 6,464,266 B1 | 10/2002 | O'Neill et al. |
| 6,467,752 B2 | 10/2002 | Woods |
| D470,915 S | 2/2003 | Ball |
| 6,513,543 B1 | 2/2003 | Noll et al. |
| 6,517,124 B1 | 2/2003 | Le Quere |
| 6,526,701 B2 | 3/2003 | Stearns et al. |
| 6,532,986 B1 | 3/2003 | Dickey et al. |
| D473,631 S | 4/2003 | Lai |
| 6,550,495 B1 | 4/2003 | Schulze |
| 6,631,623 B1 | 10/2003 | Ball |
| D482,431 S | 11/2003 | Ball |
| 6,678,903 B1 | 1/2004 | Rhodes |
| 6,679,473 B1 | 1/2004 | Ball |
| 6,769,446 B1 | 8/2004 | Ball et al. |
| 6,805,154 B1 | 10/2004 | Dickey et al. |
| 6,816,072 B2 | 11/2004 | Zoratti |
| 6,830,063 B1 | 12/2004 | Ball |
| 6,857,442 B1 | 2/2005 | Ball et al. |
| 6,860,523 B2 | 3/2005 | O'Neill et al. |
| 6,880,573 B2 | 4/2005 | Berkman et al. |
| 6,883,534 B2 | 4/2005 | Ball et al. |
| 6,899,120 B1 | 5/2005 | Motley |
| 6,948,509 B1 | 9/2005 | Ball et al. |
| 6,948,518 B1 | 9/2005 | Ball |
| 7,013,910 B2 | 3/2006 | Tripp |
| D521,113 S | 5/2006 | Ball |
| 7,059,937 B2 | 6/2006 | Brown |
| RE39,235 E | 8/2006 | Schuler et al. |
| 7,100,637 B1 | 9/2006 | Ball |
| 7,111,875 B2 | 9/2006 | Ball |
| 7,143,779 B2 | 12/2006 | Parker |
| 7,234,479 B2 | 6/2007 | Murdock |
| 7,234,732 B2 | 6/2007 | Ball |
| 7,258,128 B2 | 8/2007 | Gomo et al. |
| 7,314,057 B2 | 1/2008 | Parker |
| D574,065 S | 7/2008 | Ball |
| 7,434,593 B2 | 10/2008 | Noll et al. |
| 7,472,718 B2 | 1/2009 | Ball |
| 7,730,901 B2 | 6/2010 | Ball |
| 8,042,565 B2 | 10/2011 | Ball |
| 8,408,238 B1 | 4/2013 | Anderson |
| 8,474,476 B2 | 7/2013 | Ball et al. |
| 8,955,538 B2 | 2/2015 | Ball et al. |
| 9,228,327 B2 | 1/2016 | Ball et al. |
| 2001/0003350 A1 | 6/2001 | Gandy et al. |
| 2002/0189674 A1 | 12/2002 | Meeder |
| 2005/0173001 A1 | 8/2005 | Murdock |
| 2006/0117734 A1 | 6/2006 | Larkin et al. |
| 2006/0254647 A1 | 11/2006 | Ball |
| 2007/0039649 A1 | 2/2007 | Ball |
| 2007/0044838 A1 | 3/2007 | Ball |
| 2007/0044840 A1 | 3/2007 | Ball et al. |
| 2007/0163653 A1 | 7/2007 | Gomo et al. |
| 2007/0240765 A1 | 10/2007 | Katzman et al. |
| 2008/0047612 A1 | 2/2008 | Ball |
| 2016/0153179 A1 | 6/2016 | Ball et al. |

OTHER PUBLICATIONS

MPH-24D Pedestal Hydrant, MAPA Products, Apr. 2007, 1 page.
MPH-24FP Pedestal Hydrant, MAPA Products, Jan. 2004, 1 page.
MPH-24 Pedestal Hydrant, MAPA Products, Jan. 2004, 1 page.
"VB-222 Self-Draining Hose Connection Vacuum Breaker," A.W. Cash Value Company Model VB-222, Mar. 12, 2008, pp. 1-2.
Official Action for Canada Patent Application No. 2,734,529, dated Jul. 20, 2012 2 pages.
Notice of Allowance for U.S. Appl. No, 13/048,445 dated Mar. 6, 2013, 8 pages.
Official Action for U.S. Appl. No. 13/933,264 dated Apr. 11, 2014, 17 pages.
Final Action for U.S. Appl. No. 13/933,264 dated Jul. 25, 2014, 10 pages.
Notice of Allowance for U.S. Appl. No. 13/933,264 dated Oct. 16, 2014, 5 pages.
Official Action for U.S. Appl. No. 14/623,730 dated Aug. 25, 2015 9 pages.
Notice of Allowance for U.S. Appl. No, 14/623,730, dated Sep. 22, 2015, 5 pages.
Official Action for U.S. Appl. No. 14/988,600 dated Sep. 21, 2016 9 pages.

SANITARY HYDRANT

This application claims the benefit of U.S. Provisional Patent Application Ser. No. 62/301,612 filed Feb. 29, 2016, the entire disclosure which is incorporated by reference herein.

FIELD OF THE DISCLOSURE

The present disclosure is generally related to contamination-proof hydrants that, when not in use, employ a self-contained reservoir to store water beneath a freeze line located below the surface of the earth.

BACKGROUND OF THE DISCLOSURE

Sanitary hydrants prevent harmful bacteria, such as *Escherichia coli* (*E. coli*), that may be in the groundwater or surrounding soil from contaminating the water source and/or water exiting the hydrant. Many states and local municipalities have adopted hydrant requirements to prevent such contamination, an example of which may be found in Rule 1057 of the American Society of Sanitary Engineers (ASSE). These requirements have forced municipalities, ranchers, camp sites, and other entities with outdoor operations to use contamination-proof "sanitary" hydrants as opposed to the "non-sanitary" hydrants previously employed to accommodate water delivery needs.

To prevent freeze-related damage, non-sanitary hydrants known in the art employ weep holes positioned below the frost line to drain water contained within the hydrant after the hydrant is shut off. Weep holes, however, do not always prevent freezing. Due to fluctuations in the degree of water saturation of the ground surrounding the hydrant (which may be caused at least in part due to frequent use of the hydrant), the drain water may not always percolate into the ground before it freezes. In addition, if the groundwater level rises above the weep hole, then groundwater may enter the hydrant through the weep hole. The groundwater may be contaminated. If so, each time the hydrant is turned on, the contaminated water in the operating pipe may mix with the water drawn from the water source, thereby causing spoiled water to be expelled by the hydrant and/or spoilage of the water source.

To prevent the backflow of water into the non-sanitary hydrant, a check valve is often employed. If, however, the check valve wears out or malfunctions, contaminated water may enter the hydrant, thus endangering crops, livestock, and humans.

One skilled in the art will appreciate that hydrants employing weep holes open to groundwater may be susceptible to deliberate contamination by a malfeasor, or even to accidental contamination by a careless actor. More specifically, it is easily seen how contaminants placed into the ground could infiltrate into a damaged hydrant and spoil a water supply. In addition, an ancillary problem with non-sanitary hydrants is that contaminated water may affect the food supply. For example, in 2006 an *E. coli* scare occurred in the United States, wherein people became sick or died after they consumed spinach that had been watered and/or cleaned by water from a source that had been polluted by *E. coli*. Hydrants that are isolated from the surrounding soil are thus more desirable than those that are open to the surrounding soil, at least because they substantially prevent water spoilage by natural and unnatural sources.

One way to address this concern is to provide a freezeless sanitary hydrant that does not include a path for water to exit (and therefore does not include a path for contaminated water to enter) the hydrant after shut-off. For example, U.S. Pat. No. 5,246,028 to Vandepas ("Vandepas"), which is incorporated by reference in its entirety herein, discloses a sanitary hydrant that includes an isolated reservoir that contains water below the frost line after the hydrant is shut off. When the hydrant is turned on, water from the reservoir is fed into the operating pipe along with the water from the source. Thus the water that previously drained from the operating pipe (e.g. the portion of the hydrant between the reservoir and the hydrant head) never has a chance to become contaminated. Vandepas employs a venturi that reduces the pressure of the water entering the hydrant, which suctions the stored water from the reservoir to be mixed with the inlet water. Venturi-dependent systems, however, require several parts (which add to the cost of such systems) and are often undesirable because they are difficult to fabricate, install and repair.

SUMMARY OF THE DISCLOSURE

The present disclosure describes a sanitary hydrant that addresses the long felt need in the field of sanitary yard hydrant technology to provide a system that is easier to incorporate, operate, and repair than known hydrants and that prevents both freeze-related damage and contamination. The improved freeze-proof sanitary yard hydrant employs an isolated reservoir below the freeze level. When the hydrant is turned off, water drains from the portions of the hydrant above the reservoir into the reservoir, thus protecting the hydrant from freeze damage. Additionally, hydrants according to the present disclosure employ a piston to evacuate water from the reservoir when the hydrant is turned on, and to draw water into the reservoir from the portions of the hydrant above the freeze level when the hydrant is turned off. These and other features of the hydrants described herein facilitate installation, operation, and repair thereof, while also protecting the hydrant from freeze damage and contamination.

It is thus one aspect of the present disclosure to provide a hydrant that evacuates water from portions of the hydrant above the freeze level when the hydrant is not in use.

It is another aspect of the present disclosure to isolate the interior of the hydrant from soil, groundwater, and other contamination sources, so as to provide a sanitary hydrant.

It is still another aspect of the present disclosure to provide a hydrant that may be installed without difficulty, operated easily, and repaired from above ground level while still installed.

[Insert Claims Prior to Filing]

Embodiments of the present disclosure provide a hydrant comprising an upper pipe interconnected to a lower pipe via a reservoir pipe that contains a piston and a housing. A reservoir defined by the inner diameter of the reservoir pipe, an upper surface of the piston and a lower surface of the housing, contains water from an operating pipe, which is positioned within the upper pipe and interconnected to a head of the hydrant, after the hydrant is shut-off. As the hydrant is turned on, the piston is forced downward within the reservoir, such that it pressurizes the water in the reservoir. The stored water then flows out of the reservoir into the operating pipe and out the head of the hydrant. As the piston reaches full stroke, it actuates a valve that allows water to flow from a water supply source through the operating pipe and out the head of the hydrant. The piston is drawn upward as the hydrant is turned off, thus expanding the reservoir and creating suction therein which draws the water from the operating pipe and the hydrant head into the reservoir. That is, the fluid that was flowing through the operating pipe when the hydrant was on is transferred to the reservoir located below the frost line to prevent freezing of the hydrant. One skilled in the art will appreciate that the water within the hydrant never has an opportunity to mix with groundwater, thus contamination of the water exiting the hydrant and/or the water source is prevented. Embodiments of the present disclosure use less moving parts and are easier to manufacture, install, maintain and repair than sanitary hydrants of the prior art. Although water has been indicated as the fluid being transferred, one skilled in the art will appreciate that sanitary hydrants (hereinafter "hydrant") as outlined herein may be used with any fluid. In addition, although a cylindrical construction has been alluded to, one skilled in the art will appreciate that the pipes that make up the hydrants as shown and described may be of any shape that allows for the flow of a fluid.

It is another aspect of hydrants according to embodiments of the present disclosure that such hydrants be constructed of commonly used materials and processes. Embodiments of the present disclosure employ the head, operating pipe, external construction, etc. as other hydrants known in the art. One major difference is that embodiments of the present disclosure employ at least one movable piston as opposed to a venturi to provide a mechanism that transfers fluid from the reservoir. The housing that defines the upper portion of the reservoir may include at least one valve to facilitate expulsion of the fluid in the reservoir and, conversely, movement of the piston to allow the reservoir to be filled after the hydrant is shut off.

The Summary of the Disclosure is neither intended nor should it be construed as being representative of the full extent and scope of the present disclosure. That is, these and other aspects and advantages will be apparent from the disclosure of the disclosure(s) described herein. Further, the above-described embodiments, aspects, objectives, and configurations are neither complete nor exhaustive. As will be appreciated, other embodiments of the disclosure are possible using, alone or in combination, one or more of the features set forth above or described below. Moreover, references made herein to "the present disclosure" or aspects thereof should be understood to mean certain embodiments of the present disclosure and should not necessarily be construed as limiting all embodiments to a particular description. The present disclosure is set forth in various levels of detail in the Summary of the Disclosure as well as in the attached drawings and the Detailed Description of the Disclosure and no limitation as to the scope of the present disclosure is intended by either the inclusion or non-inclusion of elements, components, etc. in this Summary of the Disclosure. Additional aspects of the present disclosure will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of these disclosures.

FIG. 2 is a detailed view of FIG. 1 showing hydrant just before it is turned on;

FIG. 3 is a detailed view of FIG. 1 showing the hydrant after it is turned on;

Figure 1:
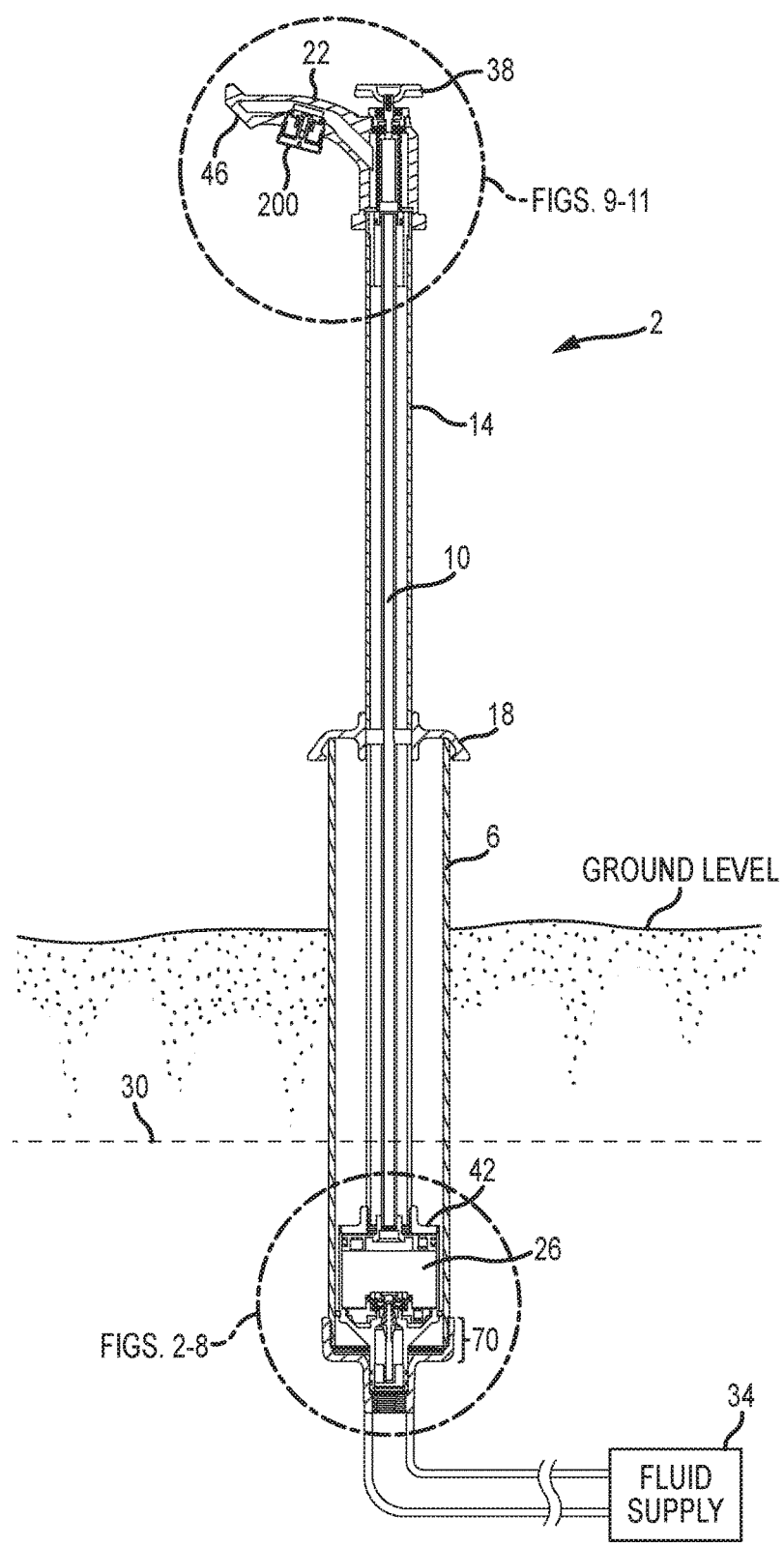
FIG. 1 is a cross-sectional elevation view showing a hydrant of one embodiment of the present disclosure.

To assist in the understanding of one embodiment of the present disclosure the following list of components and associated numbering found in the drawings is provided herein:

| # | Component |
|---|---|
| 2 | Hydrant |
| 6 | Casing |
| 10 | Fluid pipe |
| 14 | External pipe |
| 18 | Cap |
| 22 | Head |
| 26 | Canister |
| 30 | Frost line |
| 34 | Fluid supply |
| 38 | Knob |
| 42 | Piston head |
| 46 | Outlet |
| 50 | Reservoir |
| 54 | Fitting |
| 58 | Inner surface |
| 62 | O-ring |
| 66 | Fluid inlet |
| 70 | Inlet valve |
| 78 | Floor |
| 82 | Fluid |
| 84 | Sealing plate |
| 86 | Boss |
| 90 | First check valve |
| 92 | Hub |
| 94 | Valve stem |
| 98 | Plunger |
| 102 | Seat |
| 106 | Valve guide |
| 110 | Spring |
| 114 | Wall |
| 118 | Internal wall |
| 122 | Internal wall |
| 126 | Seal |
| 130 | Seal |
| 134 | Air |
| 138 | Lower portion |
| 142 | Inner portion |
| 146 | Fluid channel |
| 150 | Opening |
| 154 | 2nd check valve |
| 158 | Seal |
| 162 | Canister end |
| 166 | Screw |
| 170 | Bushing |
| 174 | Nut |
| 178 | Stem screw |
| 182 | Yoke nut |
| 186 | Collar |
| 190 | Fluid inlet opening |
| 194 | Inner annulus |
| 200 | Diverter valve |

-continued

| # | Component |
|---|---|
| 204 | Fluid outlet opening |
| 208 | Fluid conduit |

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

FIG. 1 shows a hydrant 2 of one embodiment of the present disclosure that comprises a casing 6 (also referred to herein as a lower pipe) that supports a fluid pipe 1 (also referred to herein as an inner pipe or operating pipe). The casing 6 may, but need not, be cylindrical. In some embodiments, the fluid pipe 10 is a one-fourth inch Schedule 40 galvanized pipe. Use of a narrow fluid pipe 10 (e.g. a fluid pipe having an inside diameter of one half of an inch or less, or of three eighths of an inch or less, or of one quarter of an inch or less, reduces the amount of fluid contained within the fluid pipe 10 when the hydrant 2 is turned off, and thus reduces the amount of fluid that needs to be stored after shut-off and thus the required volume of the fluid storage reservoir.

The fluid pipe 10 is positioned within an external pipe 14 (also referred to herein as an upper pipe or an outer pipe) interconnected to the casing 6 by a removable cap 18. An aperture or opening in the removable cap allows the external pipe 14 to pass through the removable cap 18 and into the casing 6. The external pipe 14 is interconnected to a hydrant head 22 on one end, and to a canister 26 (also referred to herein as a reservoir pipe) at another end. The canister 26 receives fluid from the head 22 and the fluid pipe 10 after the hydrant 2 is shut off. The canister 26 is positioned beneath the frost line 30 and is interconnected to a fluid supply 34.

In operation, the fluid pipe 10 is transitioned downwardly when a knob 38 associated with the head 22 is turned. As the fluid pipe 10 moves, a piston head 42 interconnected to an end of the fluid pipe 10 forces air and water from the canister 26 into the fluid pipe 10. Further movement of the fluid pipe 10 will open an inlet valve 70 that allows fluid to pass into the fluid pipe 10. Opening the inlet valve 70 allows fluid stored within the canister 26 and fluid from a fluid supply 34 to flow from an outlet 46 of the head 22. Turning the knob 38 in the opposite direction closes the hydrant 2 by pulling the fluid pipe 10 upwardly, which closes the inlet valve 70 and opens the canister 26 to create a fluid reservoir 50 that receives fluid from the head 22 and the fluid pipe 10. After the knob 30 is closed, fluid previously within the head 22 and the fluid pipe 10 drains into and is stored within the fluid reservoir 50 of the canister 26 below the frost line 30.

The canister 26 can be removed if the hydrant 2 is not operating correctly, by removing the cap 18 and pulling the external pipe 14 interconnected to the canister 26 from the casing 6. This feature is desirable as the casing 6 can remain in place, such that no excavation of or around the hydrant is needed. Because the inlet valve 70 of one embodiment is integrated with the canister 26, the fluid supply 34 must be shut off to make repairs. A new external pipe 14 and interconnected canister 26 can then be inserted into the existing casing 6, or the damaged components of the existing external pipe 14, head 22, or canister 26 can be repaired and replaced within the casing 6. In other embodiments, the casing 6 may be provided with an automatic shutoff valve that closes when the canister 26 is removed. For example, the automatic shutoff valve may comprise a spring-loaded valve that is held in the open position when the canister 26 is installed, but that springs into the closed position when the canister 26 is removed. In still other embodiments, the inlet valve is connected to the casing 6 and remains fixed when the canister 26 is removed.

FIGS. 2-8 show the canister 26 and associated components of one embodiment of the present disclosure in detail. Here, the canister 26 includes a fitting 54 interconnected to the external pipe 14. The canister 26 is interconnected to an inner surface 58 of the casing by way of an o-ring seal 62, and the canister 26 is slidingly interconnected in the casing 6 to facilitate removal thereof for repair or replacement. The external pipe 14 accommodates the fluid pipe 10 that, along with providing a fluid conduit from the fluid inlet 66 to the head 22, acts as a control rod for the piston 42 that selectively opens the inlet valve 70. In operation, which will be described in further detail below, as the piston head 42 is transitioned downwardly by rotation of the knob 38, fluid within the reservoir 50 is forced out of the canister 26 through the fluid pipe 10 and out of the head 22. As the hydrant 2 is shut off by counter-rotation of the knob 38, the piston head 42 moves upwardly, away from the canister floor 78, thereby creating the reservoir 50 that accepts fluid from within the fluid pipe 10 and the head 22. In some embodiments, the upward movement of the piston 42 within the canister 26 after the inlet valve 70 has closed creates a vacuum that suctions water from the head 22 and the fluid pipe 10 into the reservoir 50.

Figure 2:
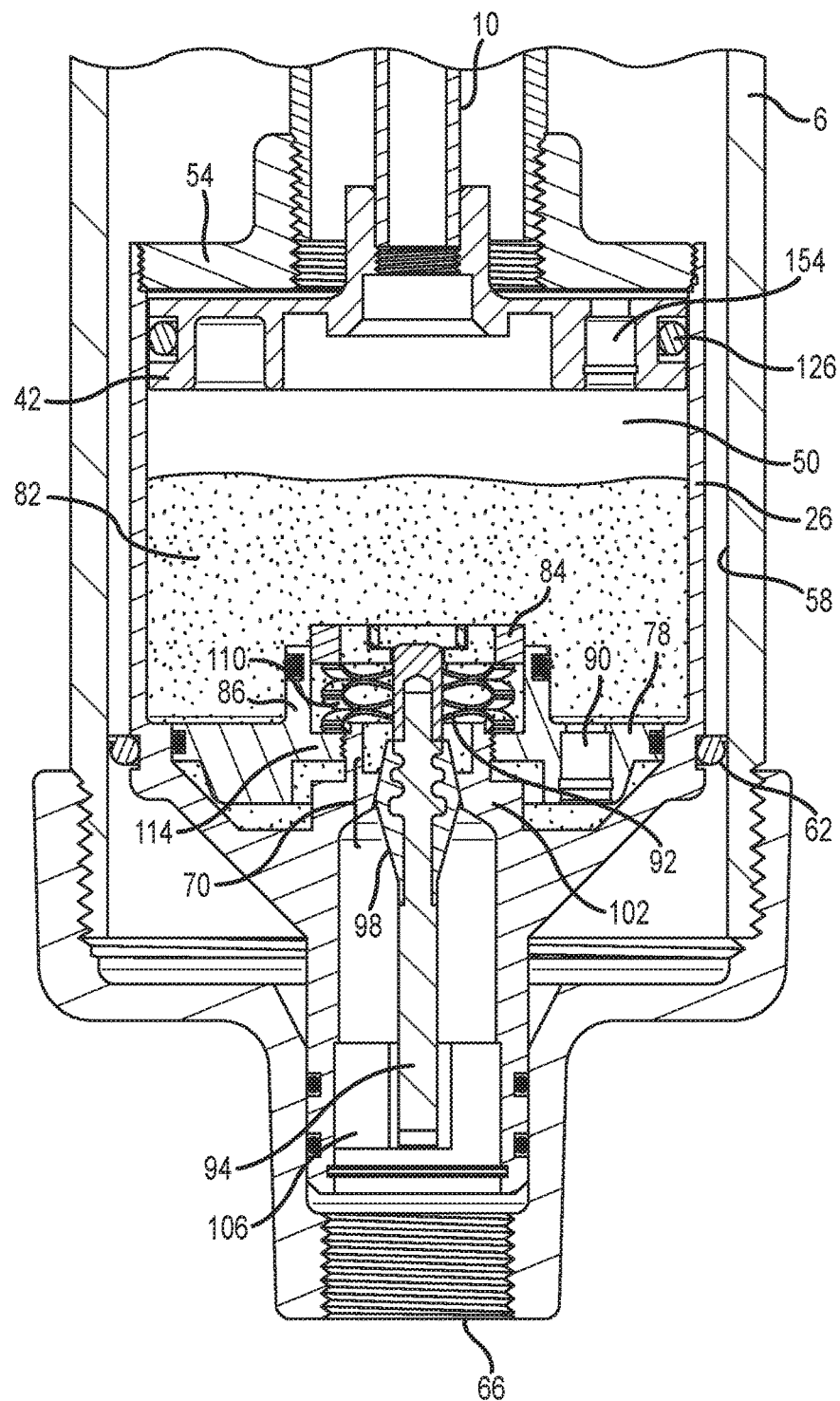

FIG. 2 shows the canister 6 just before the hydrant knob 38 is turned to open the hydrant 2 to fluid flow. Here, the fluid pipe 10 and interconnected piston head 42 are positioned near the fitting 54. In this configuration, a reservoir 50 is provided that contains fluid 82 that drained from the head 22 and the fluid pipe 10 after the hydrant 2 was previously shut off. A movable sealing plate 84 is positioned within a boss 86 extending from the canister floor 78. The canister floor 78 also includes a first check valve 90, which will be described in further detail below. The sealing plate 84 includes a hub 92 interconnected to a valve stem 94. The valve stem 94 is interconnected to a plunger 98 shown engaged onto a valve seat 102 which closes the hydrant 2 to fluid flow. The valve stem 94 is held in place by a valve guide 106 that allows the valve stem 94 to slide along the longitudinal axis of the hydrant 2. Fluid pressure acting on lower surfaces of the valve plunger 98 keeps the valve closed. A spring 110 position between the sealing plate 84 and a wall 114 of the canister floor 78 prevents the sealing plate 84 from undesired downward movement, which would unseat the valve plunger 98 and allow water to enter the canister 26. The spring 110 of one embodiment of the present disclosure is a wave spring.

Figure 3:
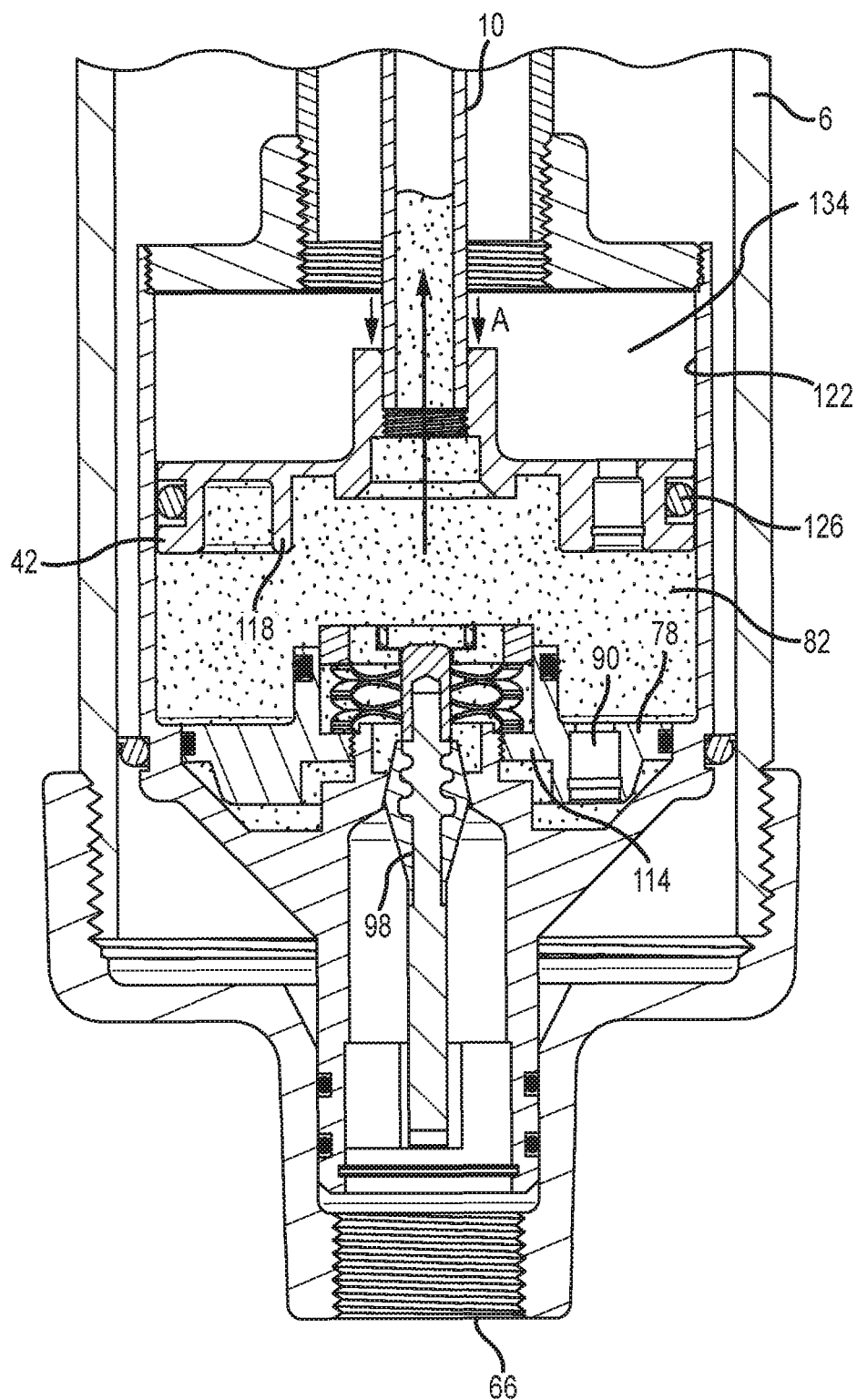

FIG. 3 shows the canister 26 configuration just after the knob 38 is turned to open the hydrant to fluid flow, but before full flow. To initiate full flow, it is necessary to exert a downward force on the sealing plate 84 with the piston 42, so as to unseat the valve plunger 98 and allow water from the fluid supply 34 to enter the hydrant 2. As the piston 42 transitions downwardly within the canister 26 along Arrow A, the piston head 42 will exert pressure on the stored fluid 82 in the reservoir 50 and expel the fluid 82 upwardly through the fluid pipe 10 and the hydrant head 22. During this downward movement and before the piston 42 reaches the canister floor 78, the valve plunger 98 stays engaged onto the valve seat 102, preventing fluid flow from the inlet 66 into the hydrant 2. The piston head 42 includes an internal wall 118 that selectively cooperates with the boss 86 before the sealing plate 84 is contacted, which will be described in further detail below. The piston head 42 also engages an internal wall 122 of the canister 26 by way of an o-ring seal 126, one of the few "dynamic seals" (e.g. seals between system components that move relative to each other) of the system.

Figure 4:
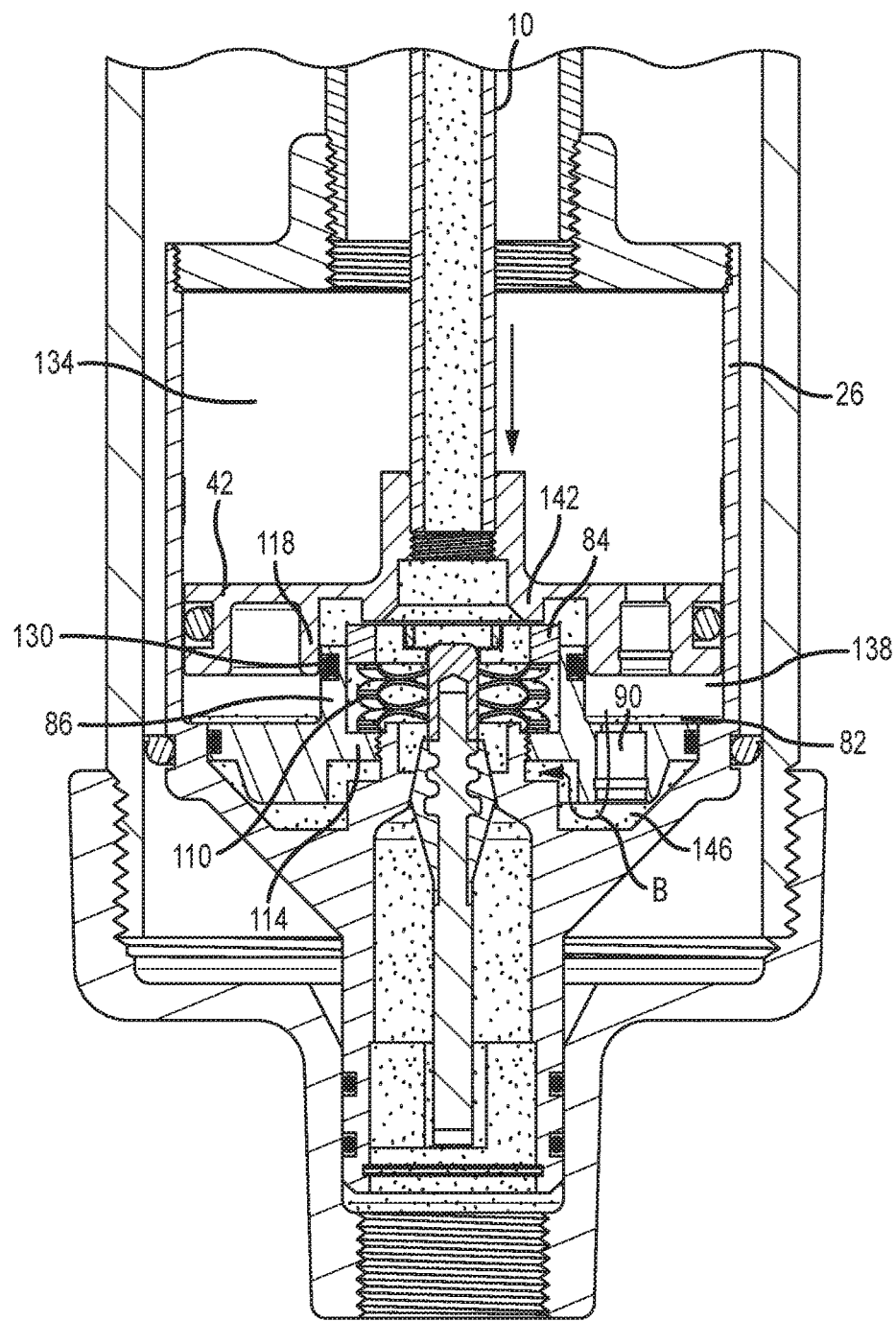
FIG. 4 is a detailed view of FIG. 1 showing the hydrant just prior to full flow.

FIG. 4 shows the final moments of canister fluid evacuation. The internal wall 118 of the piston 42 will eventually contact a seal 130 associated with the floor boss 86. Here, the reservoir 50 is substantially drained and air 134 resides over the piston head 42. But fluid 82 still resides within a lower portion 138 of the reservoir which must be expelled. In addition, at this stage the plunger 98 remains engaged to the valve seat 102. FIG. 4 also shows an inner portion 142 of the piston head 42 contacting the sealing plate 84. As the piston head 42 moves further down, the inner portion 142 will force the sealing plate 84 downwardly to compress the spring 110 and force the plunger 98 from the seat 102 to open the inlet valve.

FIG. 4 also illustrates how the first check valve 90 works. When the piston head moves downwardly, the remaining fluid 82 within the lower portion 138 of the reservoir is expelled through the first check valve 90 integrated into the canister floor 78. The first check valve 90 is a one-way check valve, so fluid can only flow in the direction of Arrow B through the fluid channel 146 provided between the piston head 42 and the floor 78. Fluid within the fluid channel 146 moves through the wall 114 by traveling through at least one opening 160 (see FIG. 8).

Figure 5:
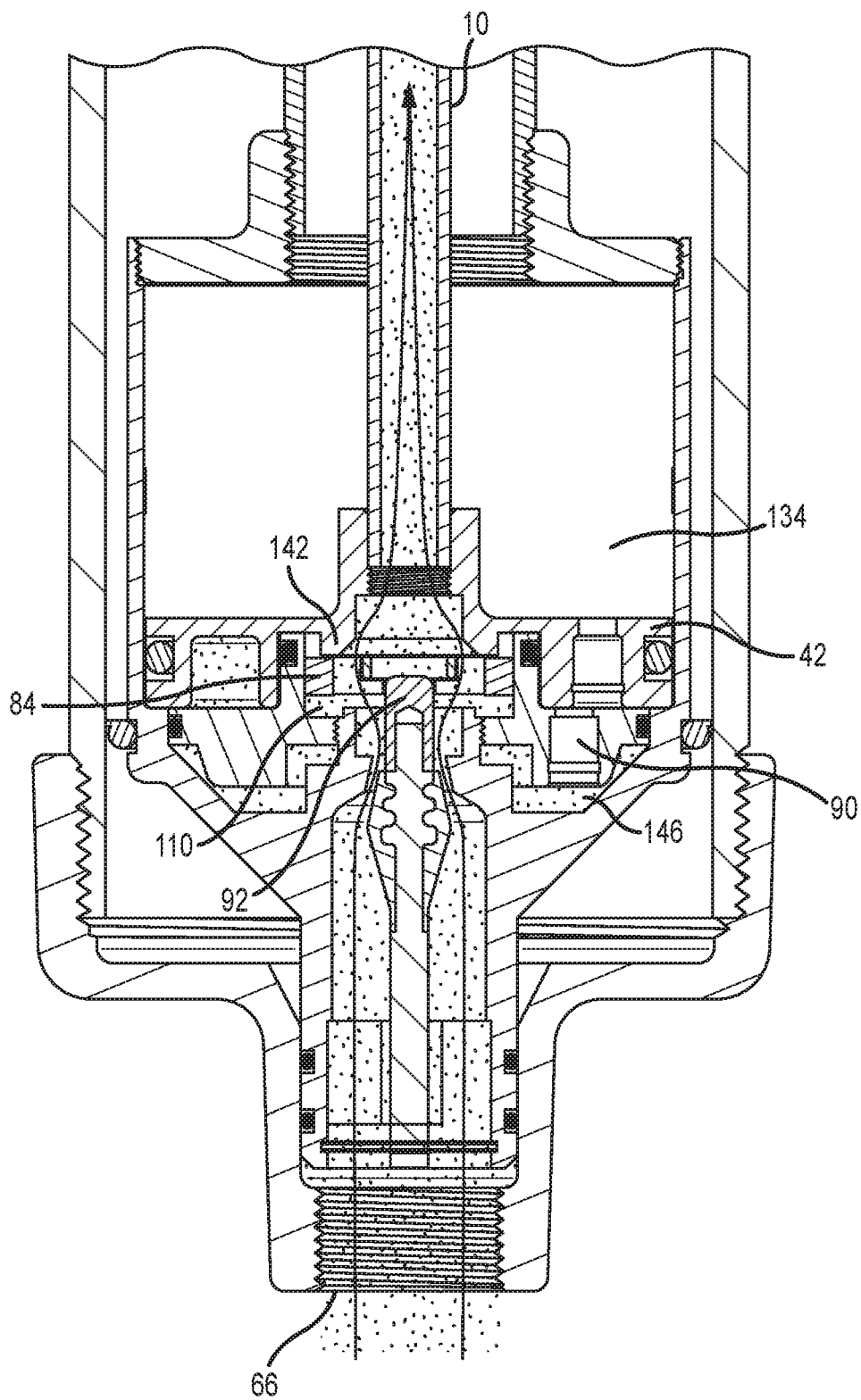
FIG. 5 is a detailed view of FIG. 1 showing hydrant during full flow.

FIG. 5 shows the hydrant at full flow. In this configuration, the piston head 42 is engaged with the canister floor 78. More importantly, the inner portion 142 of the piston head 42 has transitioned the sealing plate 84 and the integrated hub 92, which is associated with the plunger 98 or valve stem 94, downwardly to open the inlet valve 70.

Figure 6:
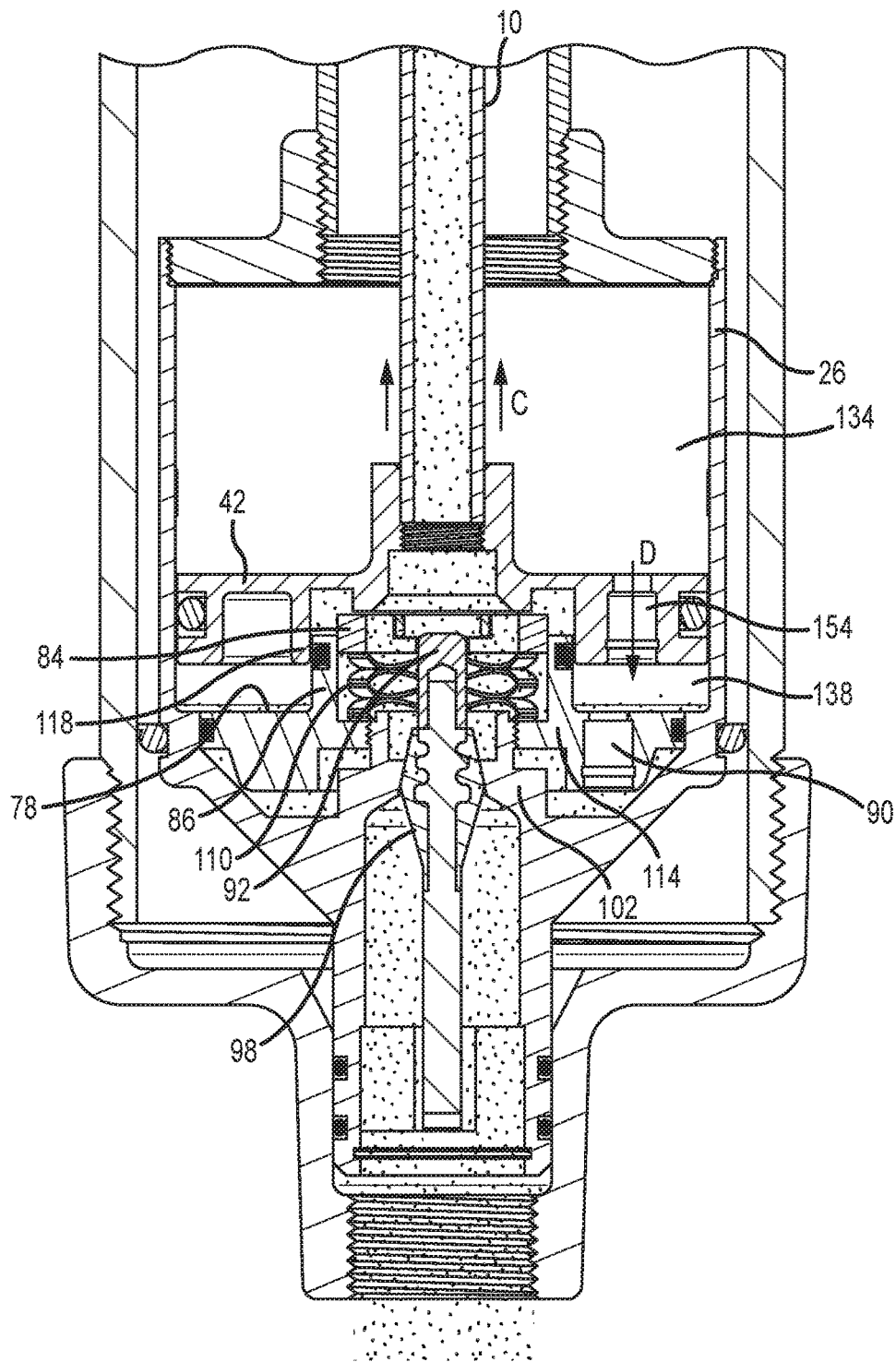
FIG. 6 is a detailed view of FIG. 1 showing the hydrant as it is beginning to close.

FIG. 6 shows the hydrant 2 as the knob 38 is being closed. As will be understood further upon review of FIGS. 9-11, closing the knob 38 will move the fluid pipe 10 and interconnected piston head 42 upwardly along Arrow C. One of ordinary skill in the art will appreciate that pulling the piston head 42 from the floor 78 may produce negative pressure between the piston head 42 and the floor 78, which may make movement of the piston head 42 difficult. In addition, air pressure within the canister 26 and the annulus between the fluid pipe 10 and the external pipe 14 may adversely affect piston head 42 movement. To ensure the piston head 42 can move upwardly, a second check valve 154 is provided to allow air 134 to move in the direction of Arrow D from above the piston head 42 to below the piston head 42. The second check valve 154 does not allow fluid or air to move into the canister as the piston head moves downwardly. Additionally, the second check valve 154 may be calibrated to open only when the pressure on one side of the valve differs from the pressure on the other side of the valve by a certain amount that is exceeded when the piston 42 is initially lifted off of the canister floor 78 (e.g. before water from the fluid pipe 10 and the hydrant head 22 can fill the space between the piston 42 and the canister floor 78 to equalize the pressure), but that is not exceeded after the piston 42 reaches a height sufficient to break the seal between the internal wall 118 and the seal 130, such that water from the fluid pipe 10 and the hydrant head 22 can drain into the reservoir 50 to equalize or reduce the difference between the pressures above and below the second check valve 154. Those of skill the art will appreciate that other methods of breaking the vacuum may be employed without departing from the scope of the disclosure.

In the configuration of FIG. 6, the first check valve 90 is closed. Movement of the piston 42 upwardly also allows the spring 110 to relax and to push the sealing plate 84 away from the canister floor 78, which allows the valve plunger 98 to move upwardly into engagement with the valve seat 102 to close the inlet valve 70.

Figure 7:
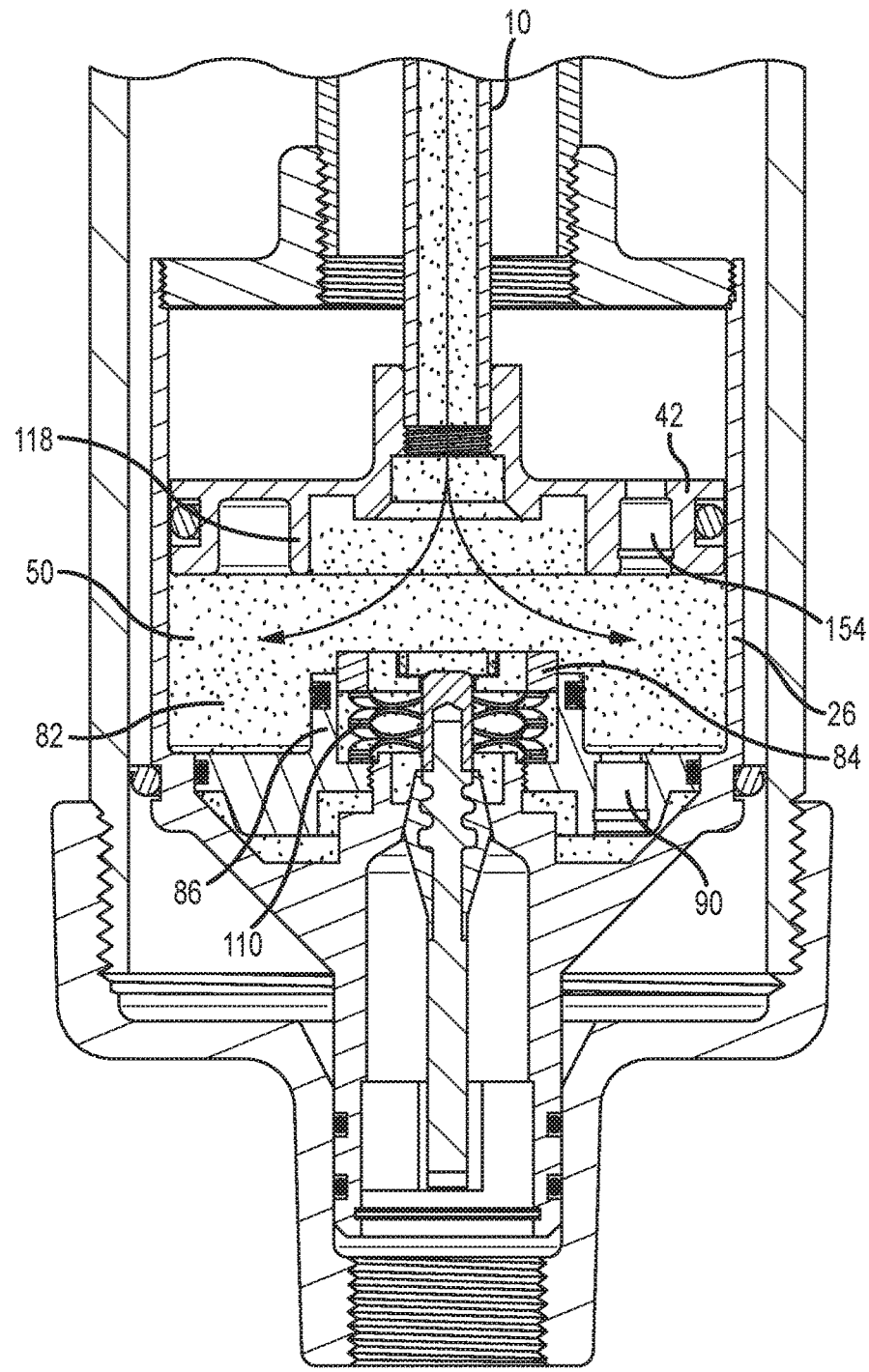
FIG. 7 is a detailed view of FIG. 1 showing the hydrant as is being closed, wherein fluid is entering a fluid storage reservoir.

As the internal wall 118 is pulled from the boss, fluid within the hydrant head and the fluid pipe 10 can flow into the reservoir 50 as shown in FIG. 7. The first check valve 90 is not opened by this action as the fluid pressure within the reservoir 50 is not as great as it is in FIG. 4 where fluid is being squeezed through the first check valve 90 at high pressure. Again, air (or water, to the extent water has escaped into the portion of the canister 26 above the piston 42) can move through the second check valve 154 and under the piston head 42 as the negative pressure created by the moving piston head 42 does open the second check valve. However, second check valve 154 does not fully equalize the pressures above and below the piston head 42 as the piston head 42 transitions upwardly, and the negative pressure within the reservoir 50 is great enough to suction the fluid from the head and the fluid pipe 10. In this fashion, the reservoir 50 is filled quickly as the piston head 42 is moved upwardly.

Figure 8:
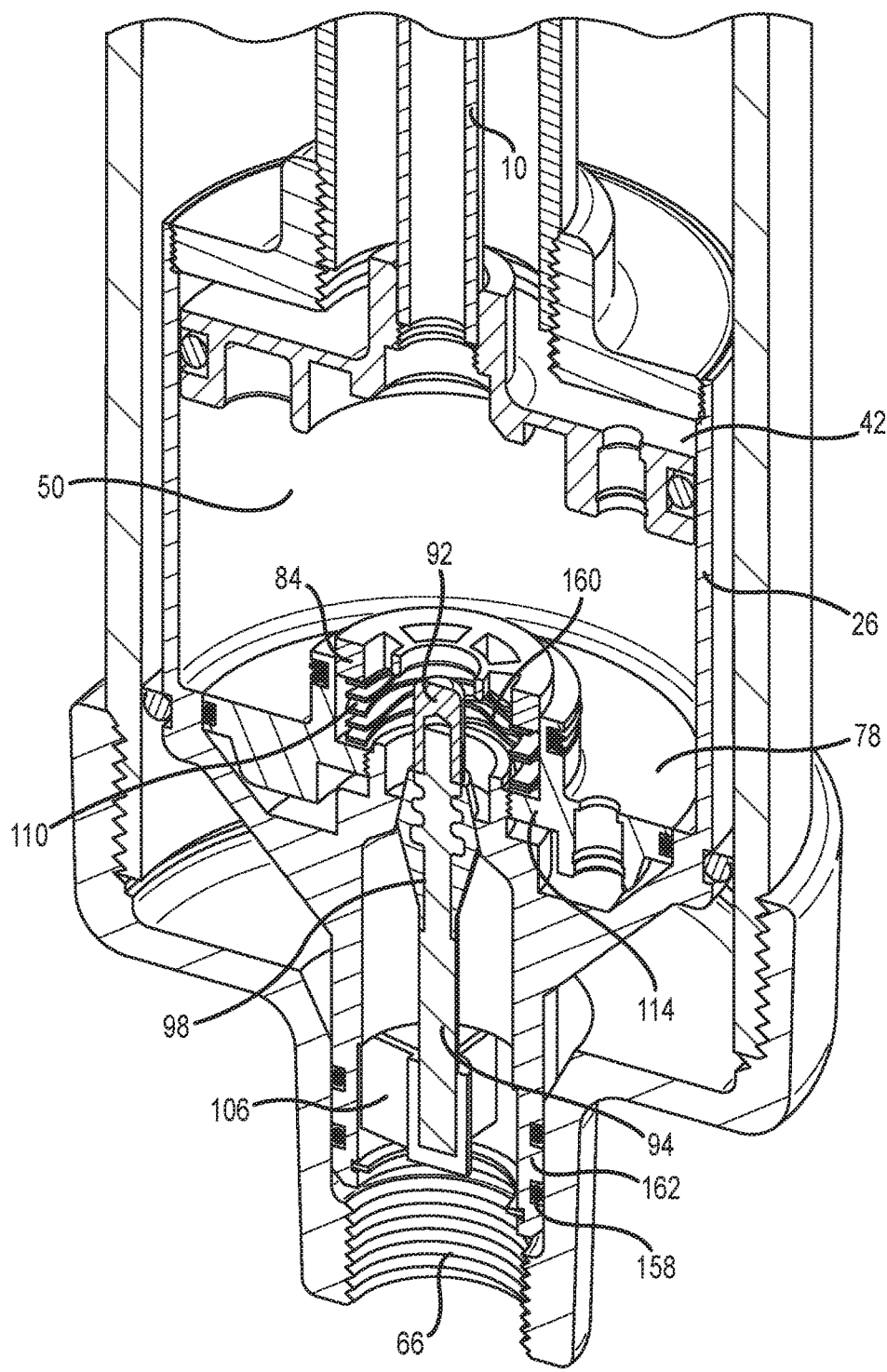
FIG. 8 is a perspective and detailed view of FIG. 1.

FIG. 8 is a perspective view showing the components of one embodiment of the present disclosure. Here, the way the spring 110 interacts with the sealing plate 84 can be understood. In addition, the hub 92 is interconnected to the upper end of the valve stem 94 and is also interconnected to the sealing plate 84. FIG. 8 further illustrates the features of the hydrant 2 that allow removal of the canister 26. That is, the canister 26 is slidingly interconnected to the fluid inlet 66 by way of at least one of o-ring seal 158. After removal of the cap 18 interconnected to the casing, as shown in FIG. 1, the canister 26 may be pulled from the casing 6 by moving the external pipe 14 upwardly. As external pipe 14 houses the fluid pipe 10 and is interconnected to the canister 26, pulling the external pipe 14 from the casing 6 will disengage a canister end 162 from the inlet 66, such that the entire assemblage may be removed.

Following removal of a canister 26 in the manner described above, installation of a new or repaired canister 26 may be accomplished by interconnecting the new or repaired canister 26 to the external pipe 14, slidingly inserting the new or repaired canister 26 and the external pipe 14 into the casing 6 until the canister end 162 (with the at least one seal 158) engages the inlet 66, and replacing the cap 18.

Figure 9:
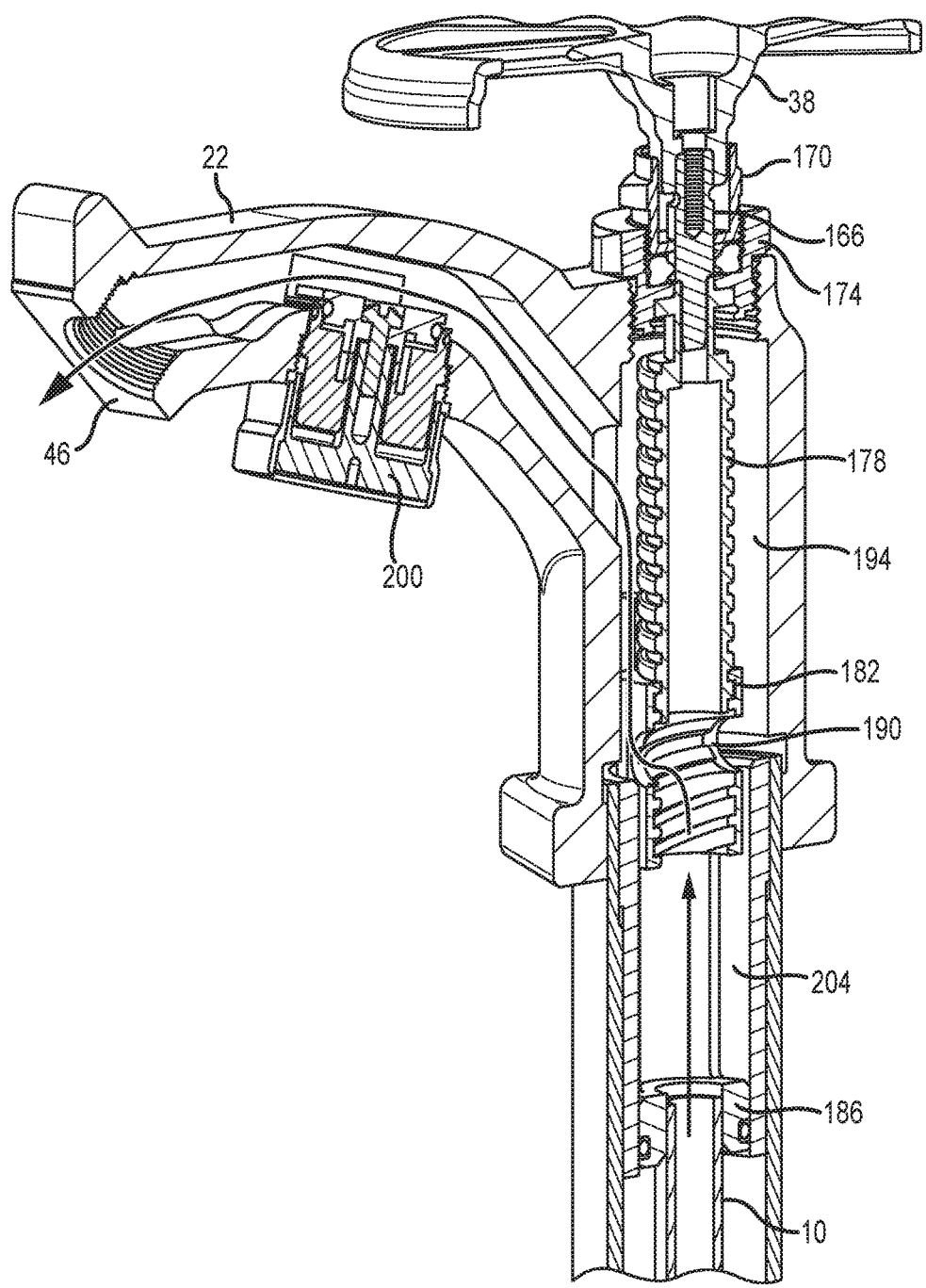
FIG. 9 is a detailed elevation view of FIG. 1 showing the hydrant head during fluid flow.
Figure 10:
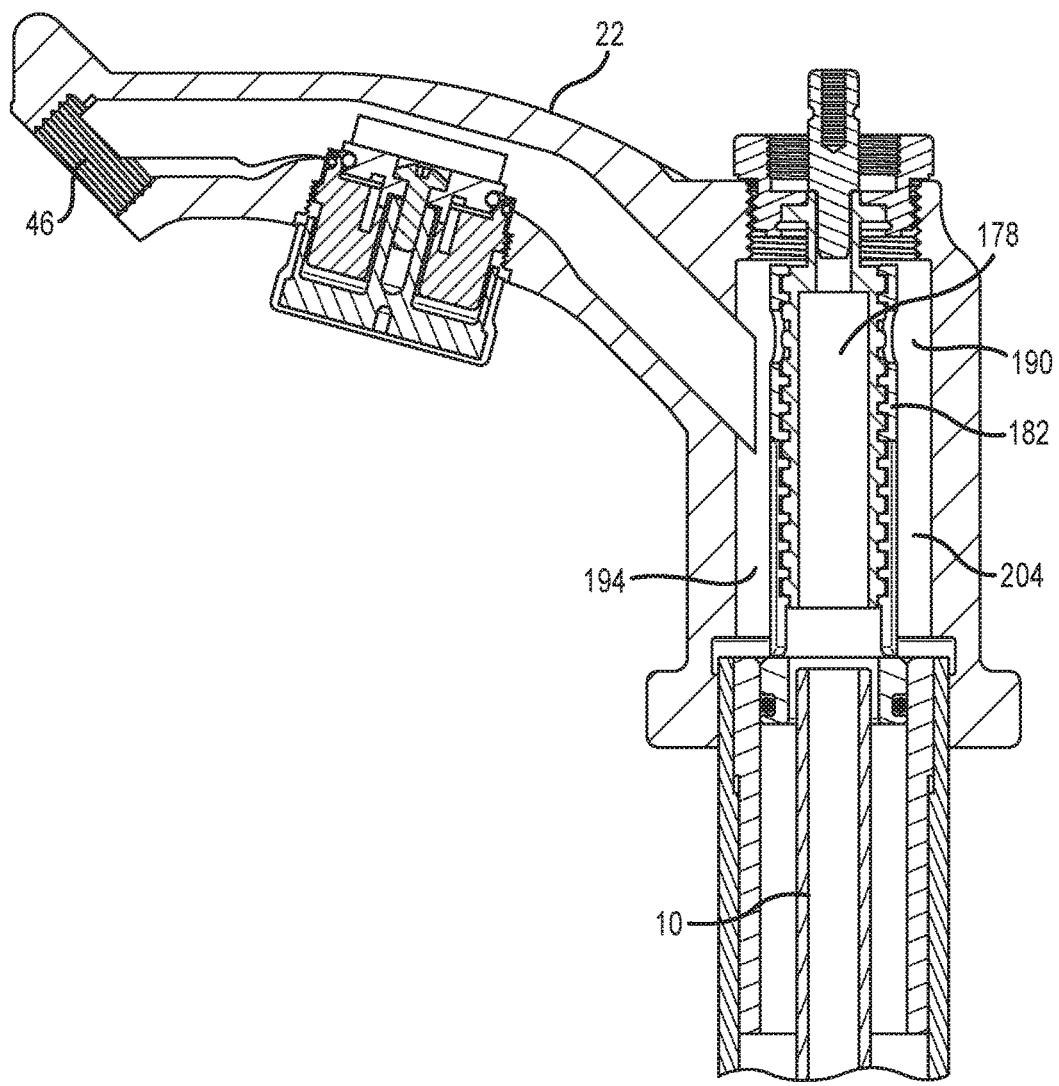
FIG. 10 is a detailed elevation view of FIG. 1 showing the hydrant head when the hydrant is closed.
Figure 11:
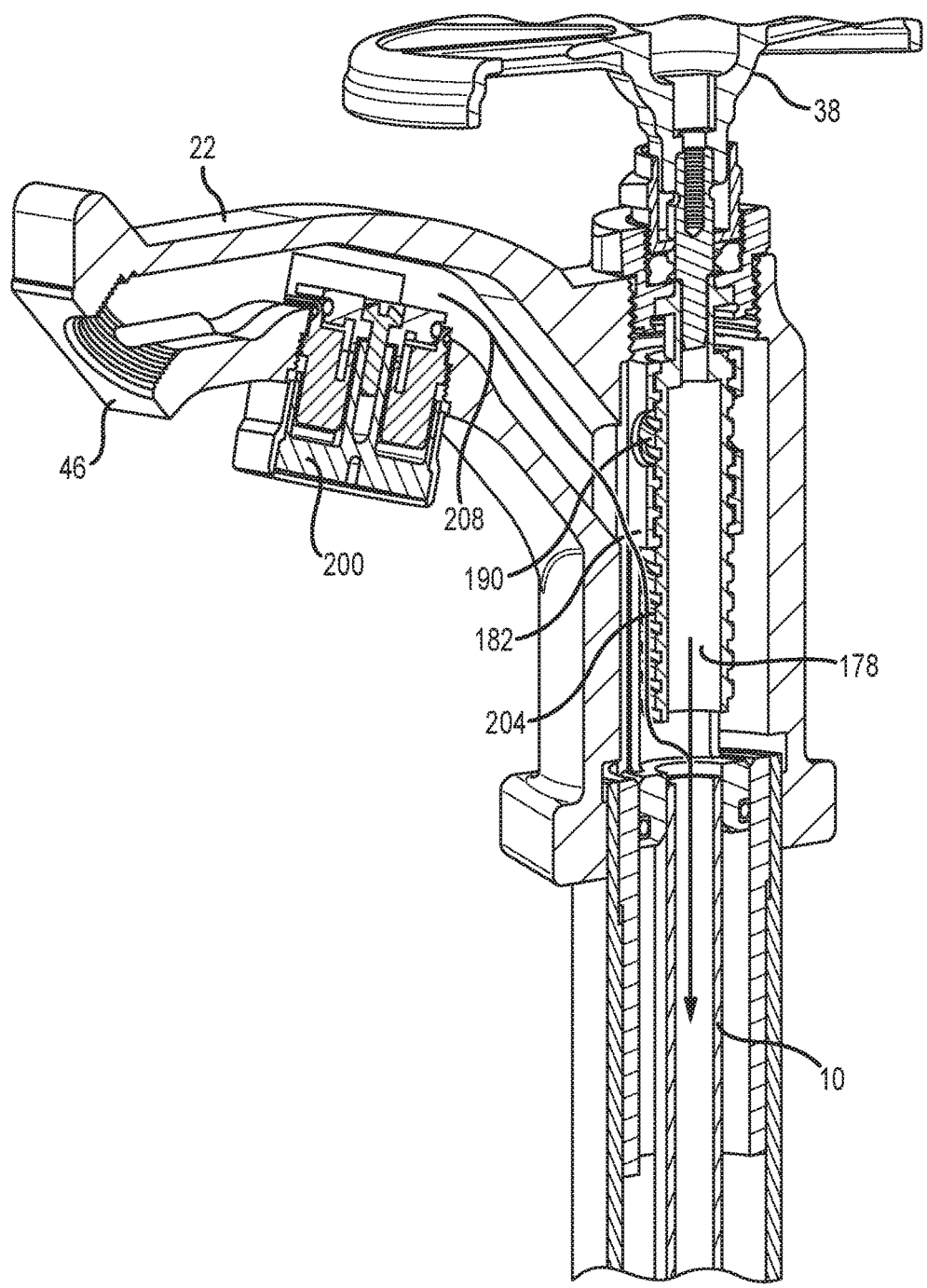
FIG. 11 is a perspective view of FIG. 10.

FIGS. 9-11 show the inner workings of the head 22 of one embodiment of the present disclosure. The knob 38 is operatively associated with a bushing 170 interconnected to the head 22 by way of a nut 174. The knob 38 is also interconnected to a stem screw 178 by way of a screw 166. The stem screw 178 has a plurality of threads engaged with corresponding threads in a yoke nut 182, wherein rotation of the stem screw 178 will move the yoke nut 182 along a longitudinal axis of the hydrant. The yoke nut 182 is interconnected to the fluid pipe 10 by way of a collar 186, wherein movement of the yoke nut 182 initiated by rotation of the stem screw 178 will selectively open and close the hydrant 2 to fluid flow.

FIG. 9 shows the configuration of the head during full fluid flow. Here, the yoke nut 182 has been moved downwardly to force the fluid pipe 10 downwardly as described above. The downward motion of the yoke nut 182 is initiated by rotation of the stem screw 178. As shown, fluid flows through the fluid pipe 10 through the yoke nut 182 and out of a fluid inlet opening 190 provided in the yoke nut. Fluid flows from the fluid inlet opening 190 into an inner annulus 194 provided between the stem screw 178/yoke nut 182 and the inner surface of the head 22. Fluid then flows from the inner annulus 194 through the fluid conduit 208 and through the hydrant outlet 46.

Because there is a volume of air within the canister and the fluid pipe 10 which must be displaced to allow fluid to flow, some embodiments of the present disclosure employ a diverter valve 200. In operation, the diverter valve is normally open, which allows air within the fluid pipe 10, inner annulus 194, and other portions of the head 22 to be expelled before fluid enters the head 22. Pressure within the head 22 will increase as fluid enters, which will cause the diverter valve 200 to close wherein fluid is provided only one exit, that being the outlet 46 of the hydrant 2. Diverter valves 200 of this type are well known and should be understood by those of skill the art.

FIGS. 10 and 11 show the configuration of the head 22 after the inlet valve 70 is closed. Here, the knob 38 (not shown in FIG. 10) and stem screw 178 have been turned in such a way as to draw the yoke nut 182 upwardly towards the knob 138. As described above, this process will draw the fluid pipe 10 upwardly, thereby closing the inlet valve 70 and ceasing fluid flow out of the hydrant outlet 46. Accordingly, fluid within the head 22 and the fluid pipe 10 can now drain into the canister 26 and be stored in the reservoir 50 created between the piston head 42 and the canister floor 78 in the canister 26.

FIG. 11 specifically shows that when the yoke nut 182 is drawn upwardly, a fluid outlet opening 204 of the yoke nut 182 is exposed. The fluid outlet opening 204 creates a path from the head 22 through the yoke nut 182, between the inner surface of the yoke nut 182 and the stem screw 178, and into the fluid pipe 10. When fluid flows from the head 22, the diverter valve 200 is closed. However, draining water from the head 22 into the fluid pipe 10 creates a negative pressure in the head 22 which is accommodated by automatically opening the diverter valve 200 to allow air into the head 22. The diverter valve 200 remains opened until the hydrant 2 is next opened to fluid flow.

Although the embodiment described above utilizes a knob 38 interconnected to a stem screw 178 to raise and lower the fluid pipe 10, other embodiments of the present disclosure may use different lifting mechanisms to raise and lower the fluid pipe 10. Any suitable lifting mechanism may be used, including, for example and without limitation, lifting mechanisms that utilize one or more levers, gears, pulleys, or cranks. For example, in some embodiments, the fluid pipe 10 is interconnected via a piston rod to one end of a lever rotatably mounted to the head 22 above the inner annulus 194. The free end of the lever can then be raised to push the piston rod—and therefore the fluid pipe 10 and the piston head 42—down and turn on the hydrant 2. The free end of the lever can be lowered to pull the piston rod—and therefore the fluid pipe 10 and the piston head 42—up and turn off the hydrant 2. In another embodiment, an upper end of the fluid pipe 10 may be interconnected to a vertically oriented rack (e.g. a linear gear), which may engage and/or be engaged by a pinion (e.g. a circular gear) mounted on or in the head 22. The pinion may be interconnected to a crank, rotation of which in a first direction causes the fluid pipe 10 to move up, thus raising the piston head 42 and turning off the hydrant, and rotation of which in a second direction causes the fluid pipe 10 to move down, thus lowering the piston head 42 and turning on the hydrant.

While various embodiments of the present disclosure have been described in detail, it is apparent that modifications and alterations of those embodiments will occur to those skilled in the art. It is to be expressly understood that such modifications and alterations are within the scope and spirit of the present disclosure, as set forth in the following claims. Further, it is to be understood that the disclosure(s) described herein is not limited in its application to the details of construction and the arrangement of components set forth in the preceding description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A sanitary hydrant, comprising:
   a casing comprising an inlet in a lower end thereof and a removable cap on an upper end thereof, the removable cap comprising a first aperture;
   an elongated external pipe extending through the first aperture and into the casing, the external pipe comprising an upper external pipe end portion outside of the casing and a lower external pipe end portion inside of the casing;
   an internal fluid pipe extending within the external pipe, the internal fluid pipe comprising an upper fluid pipe end portion and a lower fluid pipe end portion;
   a head interconnected to the upper external pipe end portion, the head comprising a first fluid channel in fluid communication with the internal fluid pipe, the first fluid channel terminating in a fluid outlet;
   a diverter valve interconnected to the head and associated with the first fluid channel to selectively allow outside air to enter the first fluid channel;
   a knob operatively interconnected to the head, the knob interconnected to the upper fluid pipe end portion with a stem screw such that rotation of the knob causes the internal fluid pipe to translate vertically between a first position and a second position;
   a canister slidably interconnected to the casing, the canister comprising:
      an internal wall;
      a fitting interconnected to an upper portion of the internal wall and the lower external pipe end portion, the fitting comprising a second aperture through which the lower fluid pipe end portion extends;
      a canister end interconnected to a lower end of the internal wall, the canister end comprising a second fluid channel;
      a canister floor positioned between the fitting and the canister end and comprising a third aperture; and
      a valve extending through at least a portion of the second fluid channel and at least a portion of the third aperture, the valve selectively displaceable from a closed position to an open position, the open position allowing fluid to flow from the inlet of the casing into the internal fluid pipe via the second fluid channel and the third aperture; and
   a piston head interconnected to the lower fluid pipe end portion and slidably engaged with the internal wall of the canister, the piston head configured to translate vertically within the canister, the piston head positioned adjacent the fitting when the internal fluid pipe is in the first position and adjacent the canister floor when the internal fluid pipe is in the second position, the piston head further configured to switch the valve to the open position when the internal fluid pipe is in the second position.

2. The sanitary hydrant of claim 1, wherein the piston head comprises a check valve that allows fluid transfer from an upper side of the piston head to a lower side of the piston head.

3. The sanitary hydrant of claim 1, wherein the canister floor comprises a check valve that allows fluid transfer from an upper side of the canister floor to a lower side of the canister floor.

4. The sanitary hydrant of claim 1, wherein the piston head is slidably engaged with the internal wall of the canister with a seal.

5. The sanitary hydrant of claim 1, wherein the canister is slidably interconnected to the casing with a seal therebetween.

6. The sanitary hydrant of claim 1, wherein the canister floor further comprises a boss surrounding the third aperture and extending toward the fitting, the boss positioned to slidably engage with an internal wall of the piston head when the internal fluid pipe is in the second position.

7. The sanitary hydrant of claim 6, wherein the canister further comprises an O-ring supported by a channel in the boss, the O-ring creating a seal between the boss and the internal wall of the piston head when the internal fluid pipe is in the second position.

8. The sanitary hydrant of claim 1, wherein the canister end is interconnected to the lower end of the casing with at least one seal.

9. The sanitary hydrant of claim 1, wherein the valve comprises a valve stem extending through the second fluid channel and the third aperture, the valve stem supported for translation along a longitudinal axis of the second fluid channel by a valve guide, the valve stem further interconnected to a plunger that prevents fluid flow through the second fluid channel or the third aperture when the valve is in the closed position.

10. The sanitary hydrant of claim 9, wherein the valve stem is interconnected to a hub, the hub is interconnected to a sealing plate, and the sealing plate is biased towards the piston head with a spring.

11. The sanitary hydrant of claim 10, wherein the spring is a wave spring.

12. The sanitary hydrant of claim 10, wherein a boss surrounding the third aperture and extending towards the piston head restricts lateral motion of the sealing plate and the spring.

13. The sanitary hydrant of claim 1, wherein the internal fluid pipe is interconnected to the stem screw with a yoke nut, the yoke nut having a plurality of openings configured to allow fluid to flow between the first fluid channel and the internal fluid pipe.

14. The sanitary hydrant of claim 13, wherein the stem screw prevents fluid flow through at least one of the plurality of openings when the internal fluid pipe is in the first position.

15. A sanitary hydrant, comprising:
a cylindrical casing comprising:
an inlet in a first end thereof; and
a removable cap on a second end thereof, the removable cap comprising an opening;
an outer pipe coaxial with the casing and positioned within the opening, the outer pipe comprising an upper end outside of the casing and a lower end inside of the casing;
an inner pipe extending through the outer pipe and coaxial with the casing, the inner pipe comprising an upper end and a lower end, the inner pipe axially translatable between a first position and a second position;
a cylindrical canister slidably contained within and coaxial with the casing, the canister comprising:
an upper portion interconnected to the lower end of the outer pipe, the upper portion comprising an opening through which the lower end of the inner pipe extends into the canister;
a lower portion interconnected to the inlet of the casing;
a fluid reservoir in fluid communication with the inner pipe; and
a valve positioned within the lower portion that provides fluid communication between the inlet of the casing and the fluid reservoir; and
a piston head interconnected to the lower end of the inner pipe and slidingly positioned within the canister, the piston head configured to open the valve when the inner pipe is in the first position.

16. The sanitary hydrant of claim 15, wherein the piston head comprises a check valve that allows fluid transfer from an upper side of the piston head to a lower side of the piston head.

17. The sanitary hydrant of claim 15, wherein the valve comprises a valve stem extending through the lower portion, the valve stem positioned along an axis of the cylindrical canister and supported for translation along the axis of the cylindrical canister between an open position and a closed position by a valve guide, the valve stem comprising a plunger that prevents fluid flow between the inlet and the fluid reservoir when the valve stem is in the closed position.

18. The sanitary hydrant of claim 17, wherein the valve stem is interconnected to a hub, the hub is interconnected to a sealing plate, and the sealing plate is biased towards the piston head with a wave spring.

19. A method of utilizing a self-contained reservoir to prevent contamination of a water source, the method comprising:
channeling water from an underground inlet to an above-ground outlet via an internal fluid pipe, a lower end of the internal fluid pipe terminating in a piston head disposed within a canister, the piston head engaging a valve in a lower portion of the canister to allow water to flow from the underground inlet into the internal fluid pipe, the underground inlet and the canister positioned below a frost line;
raising the piston head with the internal fluid pipe to create the self-contained reservoir within the canister, the raising causing the piston head to disengage the valve, the disengaged valve blocking fluid flow from the underground inlet into the self-contained reservoir;
collecting water from the internal fluid pipe in the self-contained reservoir; and
lowering the piston head with the internal pipe, the lowering piston head pressurizing the self-contained reservoir to force collected water to flow out of the self-contained reservoir toward the above-ground outlet via the internal fluid pipe and then engaging the valve.

20. The method of claim 19, wherein at least a portion of the internal fluid pipe axially extends within an external pipe, at least a portion of the external pipe axially extends within a casing, and the canister is disposed within the casing.

* * * * *